UNITED STATES PATENT OFFICE.

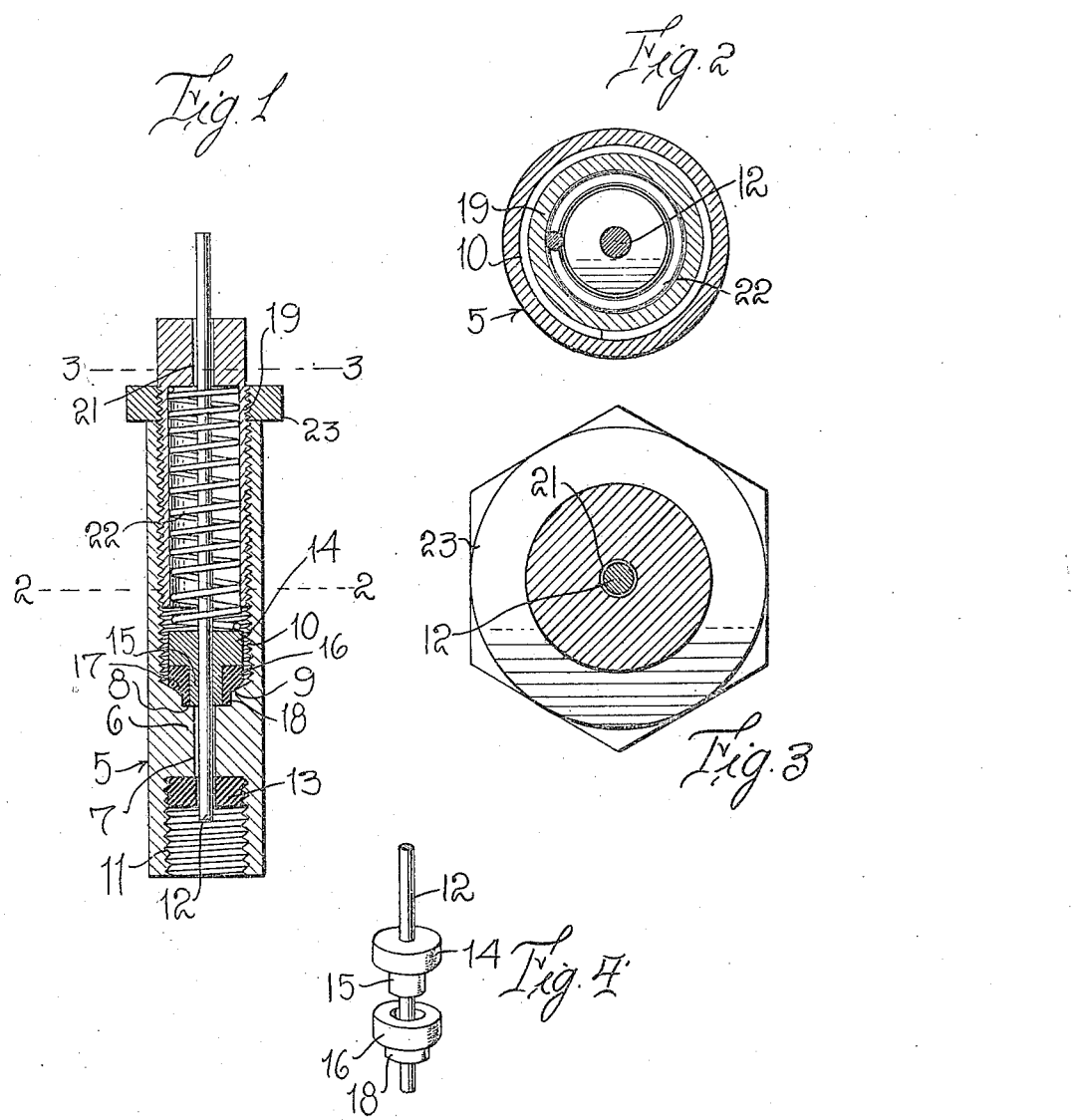

LUCIAN B. McCLEAN, OF GREEN BAY, WISCONSIN.

PRESSURE-REGULATING VALVE.

1,239,022.

Specification of Letters Patent.  Patented Sept. 4, 1917.

Application filed March 24, 1917. Serial No. 157,200.

*To all whom it may concern:*

Be it known that I, LUCIAN B. McCLEAN, a citizen of the United States, residing at Green Bay, in the county of Brown and State of Wisconsin, have invented certain new and useful Improvements in Pressure-Regulating Valves, of which the following is a specification, reference being had to the accompanying drawings.

This invention relates to an improved pressure regulating valve and has for its primary object to provide a very simply constructed and efficient safety pressure valve for pneumatic wheel tires, whereby bursting of the pneumatic tube due to over-inflation or expansion of the air contained therein will be effectually prevented.

It is another and more particular object of the invention to provide a device for the above purpose including a suitable casing for detachable connection at one of its ends to the casing of the tire valve and provided with an internal valve seat, a rod movable in said casing to engage the stem of the tire valve and open said valve, and a valve member fixed upon said rod and normally held in engagement upon the seat by a spring, means being provided for regulating the tension of said spring in accordance with the desired maximum air pressure in the wheel tire.

It is an additional object of my invention to provide a safety pressure regulating device for wheel tires which consists of relatively few parts capable of being assembled or disassembled very easily and quickly, said parts being so constructed and arranged as to absolutely prevent the escape of air from the tire tube under normal conditions.

With the above and other objects in view, my invention consists in the novel features of construction, combination, and arrangement of parts to be hereinafter more fully described, claimed, and illustrated in the accompanying drawing, in which, Figure 1 is a longitudinal sectional view through my improved pressure regulating safety valve, illustrating the preferred embodiment thereof;

Fig. 2 is a section taken on the line 2—2 of Fig. 1;

Fig. 3 is a section taken on the line 3—3 of Fig. 1; and

Fig. 4 is a perspective view of the valve rod and the parts of the valve disassembled.

Referring in detail to the drawing, 5 designates the valve casing which is of elongated, cylindrical form, and intermediate of its ends the wall of said casing is internally increased in thickness, as at 6, and such thickened portion provided with an axial bore or opening 7. At one end of the bore 7, the portion 6 is formed with an annular shoulder 8 and a flaring or inclined valve seat 9. The wall of the valve casing is internally threaded, as at 10, from this valve seat to one end of the casing. The opposite end of the casing is also internally threaded, as at 11, for engagement upon the exteriorly threaded casing of the tire valve in the usual manner.

The valve rod 12 at one of its ends extends through an opening 7 and is of slightly less diameter than said opening. A washer 13 is seated against the end face of the internal enlargement 6 on the casing wall and is adapted to bear upon the end of the tire valve casing when the device is applied. The end of the rod 12 extends through a central opening in this washer.

Upon the rod 12, a metal valve head 14 is soldered or otherwise permanently fixed and is provided with a longitudinally extending sleeve 15 closely surrounding the valve rod. A rubber valve disk 16 is engaged upon this sleeve and is provided with a beveled or inclined seating face 17 and a reduced end portion 18. The face 17 is normally engaged upon the valve seat 16 and the reduced end 18 of the valve disk extends into the enlarged end of the bore 7 upon the shoulder 8.

An adjusting sleeve 19 is engaged with the internal threads 10 of the valve casing and is provided upon one end with a cylindrical head 20 having a central, longitudinal opening 21 of slightly larger diameter than the rod 12 which extends through said opening. A coil spring 22 which is of somewhat less diameter than the internal diameter of the sleeve 19, surrounds the rod 12 and bears at one of its ends against the head 20 and at its other end against the metal valve head 14. This spring, by its expansive action, yieldingly holds the valve disk 16 in position upon the seat 9. A lock nut 23 is threaded upon the sleeve 19 and interposed between the head 20 of said sleeve and the end of the valve casing 5.

In the operation of the device, it will be understood that the threaded end 11 of the valve casing is connected to the exteriorly threaded casing of the pneumatic tire valve in the usual manner until the end of the rod 12 strikes the valve pin of the tire valve and unseats the same. The pneumatic tube having been inflated to a pressure of say seventy-five pounds, any further inflation will cause the air to escape through the open tire valve into the end of the casing 5 and pass through the bore 7 around the valve rod and exert a pressure against the valve disk 16, thus unseating said valve disk so that the air may continue its passage through the valve casing and through the opening 21 to the atmosphere. The air is also released from the tire tube when the same expands owing to high temperatures. Thus, the possibility of the pneumatic tire bursting under an excess of internal air pressure is entirely obviated by means of my invention.

From the above description, taken in connection with the accompanying drawing, the construction, manner of operation, and several advantages of the invention will be clearly and fully understood. The several parts of the device are of very simple form and can obviously be manufactured at comparatively small cost. They may also be readily assembled and disassembled and are at all times effective and reliable in practical use.

While I have herein shown and described the preferred form, construction and arrangement of the several elements, it is to be understood that the device is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:

1. A pressure regulating valve for pneumatic tires including a casing adapted for attachment to a tire valve having an internal valve seat, a rod axially movable through the casing, a valve member fixed on said rod and having a reduced, cylindrical portion, a compressible rubber disk frictionally engaged upon said reduced portion of the valve member, a sleeve threaded in said casing having a head on one end provided with an air relief opening through which the valve rod extends, and a coil spring within said sleeve bearing at one of its ends against the head and at its other end against the valve member to urge the rubber disk into yielding engagement with the valve seat.

2. A pressure regulating valve for pneumatic tires including a casing having an internal enlargement formed on its wall intermediate the ends of the casing, said casing being interiorly threaded at opposite sides of said enlargement and adapted for detachable connection at one of its ends to the casing of the tire valve, said enlargement having a central opening and a valve seat at one end thereof, a rod longitudinally movable through said opening, a valve on the rod to engage upon said valve seat, an adjusting sleeve threaded in the other end of the valve casing having a head on one end, a coil spring surrounding the rod within the sleeve and bearing at one end against said head and at its other end against the valve to yieldingly hold the latter on its seat, said head being provided with a central air escape opening, and a lock nut threaded upon said sleeve between the head thereof and the end of the valve casing.

In testimony whereof I hereunto affix my signature in the presence of two witnesses.

LUCIAN B. McCLEAN.

Witnesses:
E. S. SCHWEGER,
ARTHUR R. BOKEL.

Copies of this patent may be obtained for five cents each, by addressing the "Commissioner of Patents, Washington, D. C."